Patented Mar. 13, 1951

2,545,137

UNITED STATES PATENT OFFICE 2,545,137

CORROSION INHIBITORS

Werner David, Battersea, London, England, assignor to Shell Development Company, San Francisco, Calif., a corporation of Delaware No Drawing. Application March 14, 1947, Serial No. 734,875. In Great Britain March 20, 1946

6 Claims. (Cl. 106—14)

1

This invention relates to compositions having the ability of displacing moisture, corrosive materials and the like from corrosive surfaces. This invention also pertains to the formation on such surfaces of a non-corrosive moisture resistant protective film. More particularly this invention pertains to corrosion inhibiting compositions suitable for protecting metal and non-metal surface by rendering them impervious to water, electrolytic solutions, corrosive fluids, gases, and the like, by displacing said contaminant from said surfaces and forming thereon a tenacious protective film.

It is well known that moisture, corrosive fluids and gases, e. g. $H_2S$, $SO_2$, etc. readily attack not only metallic surfaces but non-metallic surfaces and cause corrosion, rusting, pitting and other damage to such surface. Also aqueous solutions when in contact with a metallic surface readily attack it and cause corrosion and rusting. Under certain conditions the problem of corrosion becomes exceedingly serious because once started it becomes progressively accelerated. Thus, oils containing small amounts of water become very corrosive to contacting metals. This is due to the fact that oils and particularly liquid petroleum hydrocarbons are very good solubilizers of oxygen and any moisture present therein becomes surrounded by an almost inexhaustible store of oxygen. Moisture under such conditions is inhibited from evaporating and since the rate of transfer of oxygen from hydrocarbons, such as mineral oil or gasoline, to water is limited, ideal conditions for rusting and corrosion are set up. The presence of electrolytes and formation of corrosive decomposition products in oils and the like also greatly increase the rate of corrosivity.

Under conditions where, in addition to those enumerated, elevated temperature is encountered, corrosion activity is greatly accelerated. Thus moisture, salt sprays and other contaminants or acidic decomposition products and corrosive gases formed during operation of engines, such as internal combustion engines, Diesel engines, aircraft engines, turbines and various other machinery and industrial equipment, readily attack and rust or corrode contacting metal surfaces. The damage thus caused is not to the metal surface alone for rust particles frequently break off and enter the circulating system of engines and cause plugging, clogging, and fouling of conduit lines, columns, plates, and the line of cracking equipment, tubes, evaporators, etc.

Corrosion of alloyed bearings and other alloyed

2 surfaces due to contact with water can attain such an aggravated stage as to cause great fatigue stresses to be set up, which ultimtely result in cracking of the metal.

The problem is equally serious when combating rusting and corrosion of steel drums, storage tanks used to store gasoline, hydrocarbon oils and the like. Moisture adhering to pickled steel, quenched steel, equipment such as instruments, engine starters and generators on landing crafts, hydraulic systems, machinery for metal processing and the like are also extremely susceptible to corrosion and must be protected.

Besides metal surfaces, materials such as rubber equipment, electrical insulation materials, brake and clutch lining, etc. suffer damage when in contact with water, aqueous solutions, corrosive fluids and the like.

Such contaminants also have a detrimental effect upon the medium in which they are dispersed. In lubricating and liquid fuel mediums they cause oxidation, interfere with the functioning of additives or decrease their efficiency, form emulsions and thickening of the fluid and generally cause gumming and sticking of movable parts.

Countless materials and compositions have been tried for protecting surfaces such as metal surfaces against damage caused by water, corrosive fluids and the like by forming on said surface a non-reactive corrosion protective film. Metal surfaces have been coated or treated with greases, fatty compositions, waxes, organic compounds, e. g. organic acids, amines; inorganic compounds and the like in order to protect them against corrosion. In almost all cases where no chemical reaction occurred between the surface treated and the corrosion or rust inhibitor very little benefit is derived. This is due to the fact that non-chemical reactive inhibitors are incapable of penetrating the surface being protected and are incapable of displacing the contaminant therefrom. In cases where such inhibitors are able to form protective coatings on surfaces they are easily displaced by moisture or rupture readily. They are relatively ineffective against corrosive acidic materials and hot gases such as are formed during operation of combustion and turbine engines and are easily destroyed when applied to surfaces which are subjected to high tempertures.

It is an object of this invention to protect metal surfaces in contact with corrosive contaminants against corrosion by treating said surfaces with a composition having the property of displacing said contaminants from said surface and forming thereon an impermeable tenacious protective film. It is another object of this invention to protect metallic surfaces with a water displacing, water resistant non-corrosive protective film having no detrimental effect upon the metal surface treated. It is still another object of this invention to provide metal surfaces with a water and acid resistant film which is not susceptible to rupture even at elevated temperatures and which could be readily removed when desired. Still another object of this invention is to form protective film on metal surfaces which are not detrimental to contacting fluids and which do not interfere with their function as lubricants, fuels, hydraulic fluids, quenching agents and the like. Another object of this invention is to form a composition of matter capable of protecting metal surfaces from corrosion, said composition also possessing lubricating properties. Another object is to form film forming metal protective compositions which are stable and readily miscible with petroleum hydrocarbons such as lubricating oils and the like. It is also another object of this invention to treat surfaces whether metallic or non-metallic so as to form thereon a protective film which is impervious to moisture and corrosive fluids, and which can be readily removed when desired. Other objects will be apparent from the following description.

It has now been discovered that various metals and other materials subjected to corrosive influences can be protected simply and effectively by treatment with a composition of matter comprising essentially a blend of a major amount of light petroleum hydrocarbons and/or their mixtures having a boiling point range of between about 50° C. and about 370° C. and minor amounts of specially selected wetting agents, spreading agents and film forming protective agents. Each component of this composition must be present in rather critical proportions and must be present at all times during the active life of the composition in order to function as an effective water displacing non-corrosive protective film forming composition.

The dispersing medium is substantially a water-immiscible hydrocarbon or halogenated hydrocarbon having a boiling point range between about 50° to 370° C. Dispersing mediums boiling outside this range have been found to be definitely inferior since they do not possess the required low surface tension and penetrating properties both towards the metal and occluded impurities present so as to allow the metal protective agent to get to the surface, displace any impurity thereon and help form a protective film. These carriers or dispersing mediums are preferably derived from petroleum hydrocarbons and may include various petroleum naphtha cuts, mineral spirits, mineral seal oil, kerosene, gas oils, kerosene $SO_2$ extract, aromatic solvents, petroleum ether, aromatic hydrocarbons such as benzene, p-xylene, o-xylene, m-xylene, cumene, butyl benzene; paraffinic hydrocarbons e. g. normal hexane, dimethyl pentane, octane, nonane, undecane, dodecane; cycloparaffin, e. g. cyclohexane, methylcyclohexane, isopropylcyclohexane; halogenated hydrocarbons such as chlorinated kerosene, carbon tetrachloride, chloroform, etc. The dispersing medium constitutes around about 60%, to 95% of the composition, depending upon its viscosity, penetrability and particular application or condition under which it is used.

Additives which have the power of wetting metal and other surfaces and displacing moisture and other contaminants therefrom so as to allow direct contact and adherence of the protective agent to the surface are essentially neutralized alkali metal salts of petroleum sulfonates derived from substantially light petroleum fractions rich in aromatics, preferably having an aromatic content between 5 to 10%. Particularly suitable for forming the sulfonates are petroleum naphthas, kerosene, transformer oils and the like. The sulfonates can be formed by any conventional means. For example, petroleum naphthas or kerosene fractions rich in aromatics can be treated with suitable amounts of sulfuric acid to obtain sulfonic acids. These acids can be recovered by alcoholic extraction and thereafter neutralized with alkali to form the alkali metal salts of these sulfonic acids. Sulfonates produced from lubricating oil fractions as well as other petroleum hydrocarbons are generally inferior to the above preferred hydrocarbons as sources for the sulfonates to be used in combination with the other additives of this invention.

Instead of using the alkali sulfonates derived from light petroleum fractions as the sole wetting agent, other well known wetting agents can be used in combination therewith. Among them can be included esters and salts containing a minimum of 8 carbon atoms in the molecule. Particular examples are soap or salts of fatty or petroleum acids obtained by oxidizing paraffin waxes, the alkali and alkaline earth metal salts, e. g. sodium, potassium, calcium or magnesium salts of wool grease, oleic acid, stearic acid, petroleum acids; alkali salts of sulfated alcohols having between about 8 to 20 carbon atoms in the molecule, e. g. sodium oleyl sulfate, sodium lauryl sulfate, sodium ocenol sulfate, ammonium lauryl sulfate; neutralized alkylated aromatic sulfates; and alkali salts of mono and poly alkyl esters of sulfodicarboxylic acid, e. g. sodium salt of diamyl sulfo succinic acid, sodium salt of dilauryl sulfo succinic acid, disodium mono cetyl monosulfo succinate, etc.

The wetting agents of this invention, namely alkali sulfonates derived from low boiling petroleum hydrocarbons rich in aromatics when used alone or in combination with other wetting agents referred to above, possess the unique property of displacing moisture from metal surfaces and in addition act as powerful penetrants, which however are readily displaceable by the protective film forming agent of this invention. This is apparently due to the fact that these wetting agents are substantially miscible with and have a great affinity for water enabling them to remove moisture from the metal surface and allowing the penetrant and protective film forming agent to come in direct contact with the surface being treated.

The amount of preferred sulfonate wetting agent referred to above when used either alone or in combination with other wetting agents varies between about 0.1 and about 10% and preferably between about 0.5 and about 6% by weight. When in combination with other wetting agent the sulfonate is always predominant.

The protective film forming, water displacing agents of this invention are blown or thickened vegetable and/or fish oils. Oils which are suitable for use include: cottonseed oil, rape oil, kapok oil, corn oil, soya bean oil, pumpkin seed oil, beechnut oil, mustard oil, rice oil; seal oil, whale oil, menhaden oil, sardine oil, cod liver oil, and the like. The preferred oils are cottonseed oil, rape oil, menhaden oil and sardine oil.

Any of the above oils can be blown by conventional means such as by air at elevated temperatures until the oil has attained the desired consistency. Usually blowing is stopped when the product has obtained the consistency of castor oil. Blowing has a profound effect upon the treated oil. Thus by the action of oxygen or air, a part of the unsaturated acids present in said oils is changed to naphtha-insoluble oxy-acids; another part decomposes into volatile acids of low molecular weight which are eliminated; and a considerable amount of polymerization, as well as lacetone formation occurs. The changes which occur by blowing oils can best be illustrated by reference to Table I.

TABLE I

|  | Sp. Gr. at 15° C. | Iodine Value | Sap. Value | Per cent oxy-acids insoluble in petroleum ether |
|---|---|---|---|---|
| Pure rape oils | 0.913 to 0.917 | 94 to 106 | 170 to 179 | 0 |
| Blown rape oils | 0.968 to 0.975 | 47 to 52 | 209 to 217 | 24 to 27 |
| Pure cottonseed oil | 0.922 to 925 | 108 to 110 | 191 to 198 | 0 |
| Blown cottonseed oil | 0.972 to 0.979 | 56 to 65 | 214 to 225 | 26 to 29 |

These blown oils have the unique property of displacing moisture from metallic surfaces and forming thereon a tenacious protective film. Just how blown oils perform this function is not exactly understood but it is believed that the polar groups formed during blowing have a strong affinity for water, allowing the rest of the material to adhere tenaciously to the metal surface and form a protective film thereon.

In order to aid the blown vegetable and/or fish oils in forming a more tenacious and permanent film as well as increase its oiliness and lubricating properties by weight, and preferably between about 10 to 15% oleaginous materials can be added. Among them being heavy hydrocarbon stock such as petrolatum, paraffin wax, ozokerite, rod wax, slack wax, microcrystalline wax, said material having attached thereto if desired polar groups such as $NH_2$, $NO_2$, OH, CHO, COOR, and the like. In addition natural waxes such as carnauba wax, candelilla wax, tapan wax; animal waxes, e. g. spermaceti, sperm oil; insect waxes, e. g. beeswax, Chinese insect wax and synthetic waxes such as the polyalkylene glycols and their derivatives can be used. Also polyhydric alcohol-fatty acid esters such as glycerol monooleate, glycerol monostearate and the like can be used. The amount of blown vegetable and/or fish oils or mixtures of blown vegetable and/or fish oils and film forming agents mentioned above used varies from between about 1% to about 20% by weight, and preferably between about 10% and about 15% by weight.

To aid in spreading the film forming metal protective agent evenly, minor amounts of alcohols and more particularly the branched chain alcohols, keto-alcohols and cycloalkanols having between about 5 to 19 carbon atoms in the molecule and preferably between about 4 to 8 carbon atoms, are added to compositions of this invention. Keto-alcohols and cyclic alcohols are preferred such as diacetone alcohol, 4-tertiary amyl cyclohexanol, di - tertiary amylcyclohexanol, methylcyclohexanol and the like. Branched chain alcohols which can be used can be derived from alcohols containing 5 to 19 carbons or such alcohols as p-tertiary amyl phenoxyethanol and di-tertiary amyl phenoxyethanol and the like. The alcohols need not be used in amounts above about 10% by weight and usually does not exceed 5% by weight. The alcohols function as spreading agents. Thus once the wetting agent with the aid of the penetrant succeeds in wetting the surface and removing the moisture or other contaminant, the alcohol helps spread uniformly the film forming protective agent on to the treated surface.

All ingredients which constitute the present composition must be present at all times. The absences of any one ingredient reduces the overall efficiency of the composition to such a degree as to render it almost useless as a moisture displacing corrosion inhibiting composition.

In order to more fully illustrate the present invention the following are examples as to methods of preparing compositions of this invention:

*Example I*

Approximately 17.5% by weight of blown rape oil and 17.5% by weight of petrolatum and 5% of sodium petroleum sulfonate derived from light petroleum hydrocarbons rich in aromatics were admixed with 9% petroleum naphtha and heated between about 130° to 200° C. under constant agitation. Slowly an additional amount of about 47% petroleum naphtha was added and the temperature maintained until a homogeneous mixture was obtained when it was allowed to cool to about 60° C. The mixture was allowed to cool down to about 30° to 40° C. and 4% of diacetone alcohol was added to the mixture while stirring.

*Example II*

A mixture of 7.5% blown rape oil, 7.5% petrolatum and 2% sodium sulfonate of the type referred to in Example I were dissolved in about 78% kerosene and heated to about 60° C. with stirring. The mixture was allowed to cool to about 30 to 40° C. and 5% diacetone alcohol with stirring.

To illustrate the pronounced water displacing and corrosion inhibiting properties compositions of this invention possess the following tests were conducted.

TEST I

A. A drop of test oil made in Example I was allowed to fall on a steel plate placed horizontally and wetted uniformly with sea water over an area of 1½" x 1½" sq. inches. The oil was allowed to spread for one minute and the plate was then suspended vertically and left for a period of 24 hours and observation for corrosion made on the area previously wetted with water. The same procedure was made using commercial products X containing lanolin, Y containing petroleum sulfonate and with kerosene.

B. A metal plate (1½" x 1½" sq.) was dipped into a beaker of sea water and then immersed in a beaker of test oil as prepared in accordance with Example I for a period of two minutes. The plate was subjected to indoor exposure for 24 hours and observation made. The test was repeated using kerosene fraction and commercial products X and Y noted above.

| Composition | Appearance of test plates after 24 hour test by Methods A and B | |
|---|---|---|
| Example I | No corrosion and channeling noted. | No corrosion and channeling effect noted. Plates were still in good condition after 72 hours. |
| Commercial Product X | A film of rust noted after 24 hours. Channeling was quite pronounced. | A film of rust noted after 24 hours. Channeling was quite pronounced. |
| Commercial Product Y | Pronounced rusting and channeling observed after 24 hours. | Pronounced rusting and channeling observed after 24 hours. |
| Kerosene | Heavy rusting and channeling observed after 24 hrs. | Heavy rusting and channeling observed after 24 hrs. |

Channeling is caused by the inability of test compounds to displace water from a plate but rather forms emulsions which when the plate is placed vertically does not run or spread over the plate uniformly but runs off in channels leaving streaks on the plate. Compositions of this invention on the other hand spread rapidly and uniformly over the surface causing the water film to coalesce into droplets which become detached from the metal and float on top of the oil so that they run off without channeling when the plate is held in a vertical position.

TEST II

To illustrate the importance of having all ingredients present in compositions of this invention the following test was conducted in which blown rape oil and petrolatum mixture was left out in one case and the sulfonate in the other. The tests were conducted in the following manner: Steel plates were coated with composition referred to in Example I, and with compositions in which the blown rape oil and petrolatum mixture was left out as well as with a composition in which the sulfonate was left out. The three plates were placed in a cabinet at 100° F. having an atmosphere of 100% humidity maintained by air bubbled into the cabinet at the rate of 12 cu. ft. an hour. Water at 180° F. was directed against a baffle plate so as to be uniformly distributed in the cabinet and prevent entrained water droplets from adhering on the steel plates. The total elapsed time was noted when corrosion first appeared.

| Composition | Time in hours |
|---|---|
| (1) Example I | 5,500 |
| (2) Composition of Example I in which the sulfonate was increased to 16% but having no blown rape oil and petrolatum mixture | 3 |
| (3) Composition of Example I containing 16% blown rape oil and petrolatum but in which no sulfonate is present | 5 |

Although the essential ingredients which constitute compositions of this invention must be present, other additives can be included such as linear polymer thickeners, asphalts, pour point depressors, dyes, alkyl and alkylol amines, organic acid, e. g. cresylic acid and naphthenic acid phenolic compounds and the like. The addition of such additives are particularly desired when compositions of this invention are required to be used as temporary lubricants.

The present compositions may be applied to a surface to be protected by a means such as immersing, flooding, spraying, brushing, trowelling and the like. The protective film formed on said surfaces adheres tenaciously enough to withstand handling, light polishing, movement and high temperatures for long periods of time. It can be removed when desired by a suitable solvent or by simply rubbing with a cloth.

The present invention having thus been fully described is not to be limited by any specific examples which have been presented herein solely for the purpose of illustration, but only by the following claims.

I claim as my invention:

1. A composition for displacing moisture from and preventing corrosion of metals having the following formula and proportions:

| | Per cent by weight |
|---|---|
| Light petroleum hydrocarbons boiling between about 50 to 370° C | 78 |
| Blown rape oil | 7.5 |
| Petrolatum | 7.5 |
| Na salt of sulfonic acid derived by direct sulfonation of a petroleum fraction containing at least 5% aromatics | 2.0 |
| Diacetone alcohol | 5.0 |

2. A composition for displacing moisture from and preventing corrosion of metal surfaces comprising a major amount of a light petroleum hydrocarbon fraction having a boiling point between about 50° to 370° C., having incorporated therewith from 1% to about 20% of a mixture of blown fixed oils selected from the class consisting of vegetable and fish oils, and a waxy petroleum fraction, from about 0.1% to about 10% of an alkali metal salt of sulfonic acid derived by direct sulfonation of a light petroleum hydrocarbon fraction containing at least 5% aromatics, and from about 5% to about 10% of an alcohol selected from the class consisting of a nonether-substituted branched chain keto-alcohol and cycloalkanol.

3. A composition for displacing moisture from and preventing corrosion of metal surfaces comprising a major amount of a light petroleum hydrocarbon fraction having a boiling point between about 50° to 370° C., having incorporated therewith from 10% to about 15% of a mixture of blown rape oil and petrolatum, from about 0.5% to about 6% of alkali metal salt of sulfonic acid derived by direct sulfonation of a light petroleum hydrocarbon fraction containing at least 5% aromatics and about 5% of an alcohol selected from the class consisting of a nonether-substituted branched chain keto alcohol and cycloalkanol.

4. A composition for displacing moisture from and preventing corrosion of metal surfaces comprising a major amount of a light petroleum hydrocarbon fraction having a boiling point between about 50° to 370° C., having incorporated therewith from 10% to about 15% of a mixture of blown rape oil and petrolatum, from about 0.5% to about 6% of alkali metal salt of sulfonic acid derived by direct sulfonation of a light petroleum hydrocarbon fraction containing at least 5% aromatics and about 5% ditertiary amylcyclohexanol.

5. A composition for displacing moisture from and preventing corrosion of metal surfaces comprising a major amount of a light petroleum hydrocarbon fraction having a boiling point between about 50° to 370° C., having incorporated therewith from 10% to about 15% of a mixture of blown rape oil and petrolatum, from about 0.5% to about 6% of alkali metal salt of sulfonic acid derived by direct sulfonation of a light petroleum hydrocarbon fraction containing at least 5% aromatics and about 5% methylcyclohexanol.

6. A composition for displacing moisture from and preventing corrosion of metal surfaces comprising a major amount of a light petroleum hydrocarbon fraction having a boiling point between about 50° to 370° C., having incorporated therewith from 10% to about 15% of a mixture of blown rape oil and petrolatum, from about 0.5% to about 6% of alkali metal salt of sulfonic acid derived by direct sulfonation of a light petroleum hydrocarbon fraction containing at least 5% aromatics and about 5% diacetone alcohol.

WERNER DAVID.

REFERENCES CITED

The following references are of record in the file of this patent:

UNITED STATES PATENTS

| Number | Name | Date |
|---|---|---|
| 2,182,992 | Lebo | Dec. 12, 1939 |
| 2,235,944 | Penniman | Mar. 25, 1941 |
| 2,248,961 | Comstock | July 15, 1941 |
| 2,262,926 | Edgar et al. | Nov. 18, 1941 |
| 2,348,715 | Adams | May 16, 1944 |
| 2,359,738 | Schiermeier | Oct. 10, 1944 |
| 2,408,971 | Duncan | Oct. 8, 1946 |
| 2,430,058 | Klaber | Nov. 4, 1947 |
| 2,467,118 | Duncan et al. | Apr. 12, 1949 |

FOREIGN PATENTS

| Number | Country | Date |
|---|---|---|
| 469,889 | Great Britain | Aug. 4, 1937 |